United States Patent
Allen

(10) Patent No.: US 12,473,080 B2
(45) Date of Patent: Nov. 18, 2025

(54) COUNTERBALANCED RETRACT ACTUATOR FOR LANDING GEAR

(71) Applicant: GOODRICH CORPORATION, Charlotte, NC (US)

(72) Inventor: Jason Bradley Allen, Morton, IL (US)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 18/745,279

(22) Filed: Jun. 17, 2024

(65) Prior Publication Data

US 2024/0336353 A1    Oct. 10, 2024

Related U.S. Application Data

(63) Continuation of application No. 17/673,521, filed on Feb. 16, 2022, now Pat. No. 12,037,105.

(51) Int. Cl.
*B64C 25/22* (2006.01)
*F15B 15/20* (2006.01)

(52) U.S. Cl.
CPC .............. *B64C 25/22* (2013.01); *F15B 15/20* (2013.01)

(58) Field of Classification Search
CPC .................................. B64C 25/22; F15B 15/20
See application file for complete search history.

(56) References Cited

U.S. PATENT DOCUMENTS

| | | | |
|---|---|---|---|
| 5,184,465 A | 2/1993 | Howard et al. | |
| 5,908,174 A | 6/1999 | Churchill et al. | |
| 6,311,927 B1 | 11/2001 | Elving | |
| 8,556,209 B2 | 10/2013 | Luce | |
| 10,696,381 B2 | 6/2020 | Plude et al. | |
| 2007/0068754 A1 | 3/2007 | Furgala | |
| 2015/0354604 A1 | 12/2015 | Froehlich et al. | |
| 2019/0210716 A1 | 7/2019 | Plude et al. | |

FOREIGN PATENT DOCUMENTS

| | | |
|---|---|---|
| GB | 485617 | 5/1938 |
| GB | 2587193 | 3/2021 |

OTHER PUBLICATIONS

European Patent Office, European Search Report dated Jun. 16, 2023 in Application No. 23156153.1.
USPTO; Notice of Allowance filed Apr. 10, 2024 in U.S. Appl. No. 17/673,521.
USPTO; Final Office Action filed Feb. 7, 2024 in U.S. Appl. No. 17/673,521.
USPTO; Non-Final Office Action filed Sep. 26, 2023 in U.S. Appl. No. 17/673,521.
European Patent Office, European Office Action dated Jan. 3, 2025 in Application No. 23156153.1.

*Primary Examiner* — Rodney A Bonnette
(74) *Attorney, Agent, or Firm* — SNELL & WILMER L.L.P.

(57) ABSTRACT

An aircraft landing gear actuation system which uses two separate actuation forces to retract aircraft landing gear is disclosed. One of the actuation forces may be provided by an actuator, such as a hydraulic actuator. Another of these actuation forces may be provided by a pressurized fluid that is directed into the actuator through a conduit that extends into a hollow interior of an actuator rod of the actuator. The pressurized fluid may be provided from a pressurized fluid source that contains a fixed volume of pressurized fluid. This pressurized fluid may exert a force on an actuator piston of the actuator or the actuator rod. The pressurized fluid may also be used to dampen the deployment of the landing gear.

9 Claims, 9 Drawing Sheets

COUNTERBALANCED RETRACT ACTUATOR FOR LANDING GEAR

CROSS REFERENCE TO RELATED APPLICATIONS

This application is a continuation of, and claims priority to and the benefit of, U.S. patent application Ser. No. 17/673,521, filed on Feb. 16, 2022, and entitled "COUNTERBALANCED RETRACT ACTUATOR FOR LANDING GEAR" which is incorporated by reference herein in its entirety for all purposes.

FIELD

The present disclosure generally relates to the field of aircraft landing gear and, more particularly, to the actuation of aircraft landing gear.

BACKGROUND

Landing gear (LG) retract actuation is usually one of the highest power users on an aircraft due to the high actuator loads and short LG retraction time requirements. There is always a need to reduce aircraft weight. LG retraction power and loads directly drives the size of the LG actuator (and the systems that drives them) and therefore weight. With electrified actuation, the need to reduce actuator loads, size, and weight is as important as ever.

SUMMARY

An aircraft landing gear actuation system is presented herein. Both the configuration of such an aircraft landing gear actuation system and features regarding the operation of such an aircraft landing gear actuation system are within the scope of this Summary.

One aspect is directed to an aircraft landing gear actuation system that utilizes an actuator and a pressurized fluid source. The actuator includes an actuator rod, an actuator cylinder, and an actuator piston. The actuator rod and actuator piston collectively move relative to the actuator cylinder when actuated, with the actuator piston being disposed within the actuator cylinder, and with the actuator rod extending from the actuator piston. A conduit extends from the pressurized fluid source and is at least disposable within an interior of the actuator rod (e.g., the conduit extends within the interior of the actuator rod at least at some point in time during operation of the actuator, and encompassing where the conduit always extends within the interior of the actuator rod).

Pressurized fluid from the pressurized fluid source may be directed into the interior of the actuator rod to exert a force on the actuator that biases the actuator piston and the actuator rod in a landing gear retraction direction. In one configuration the pressurized fluid from the pressurized fluid source exerts a fluid pressure on the actuator piston. In another configuration the pressurized fluid from the pressurized fluid source exerts a fluid pressure on the actuator rod. In either case, the fluid pressure exerts a force in a direction associated with retraction of the landing gear.

The actuator may be a hydraulic actuator, including where the pressurized fluid source uses a pressurized fluid that is separate from the hydraulic fluid used to operate the actuator. The pressurized fluid source may be disposed on an outboard side of the actuator or on an inboard side of the actuator. The actuator may be of a configuration where the actuator is operated to retract the actuator rod to in turn retract the landing gear. The actuator may be of a configuration where the actuator is operated to extend the actuator rod to in turn retract the landing gear.

The conduit may be characterized as providing a flowpath from the pressurized fluid source to a space at least partially located within the actuator rod (e.g., a counterbalance or counterbalancing space), where the pressurized fluid in this space exerts a desired force on the actuator (e.g., on a movable portion of the actuator, such as on the actuator piston and/or on the actuator rod). A portion of this conduit that is disposed within the cylinder may be referred to as a "standpipe", and the standpipe may be attached or fixed to one of the ends of the actuator cylinder. In the case where the actuator is of a configuration where the actuator is operated to retract the actuator rod to in turn retract the landing gear, the noted standpipe may be in tension at least during this particular operation of the actuator. In the case where the actuator is of a configuration where the actuator is operated to extend the actuator rod to in turn retract the landing gear, the noted standpipe may be in compression at least during this particular operation of the actuator.

Another aspect is directed to a method of operating aircraft landing gear. An actuator may be operated to exert a first retraction force on the aircraft landing gear. A second retraction force, separate from the first retraction force, may be exerted on the aircraft landing gear. This second retraction force is provided by a first fluid exerting a fluid pressure on the actuator (e.g., on an actuator piston; on an actuator rod). The aircraft landing gear is moved from a deployed position to a retracted position using each of the first retraction force and the second retraction force. The second retraction force is exerted on the actuator both when the aircraft landing gear is locked in its deployed position, as well as when the aircraft landing gear is being moved from its deployed position to its retracted position.

Operation of the actuator may include using a hydraulic fluid that is separate from the first fluid, including where the first fluid is one or more gases and where the hydraulic fluid is a liquid (e.g., oil). The fluid pressure exerted on the actuator (e.g., on a movable portion of the actuator) for the second retraction force may entail using a fixed volume (external of the actuator) of the first fluid. The first fluid may be directed into an interior of the actuator rod to exert the second retraction force on the actuator.

The second retraction force may be used to help dampen movement of the aircraft landing gear from the retracted position to the deployed position, whether by further operation of the actuator or by alternate extension (i.e., "free fall") of the landing gear. The fluid pressure for the second retraction force may be released (i.e., vented to atmosphere) in any appropriate manner to minimize forces opposing the actuator from achieving a locked state in the deployed position during "free fall" situations where the primary means of LG deployment has failed.

Various aspects of the present disclosure are also addressed by the following examples and in the noted combinations:

1. An aircraft landing gear actuation system, comprising:
   an actuator comprising an actuator rod, an actuator cylinder, and an actuator piston, wherein said actuator rod is attached to and extends from said actuator piston, and said actuator piston is movably disposed within said actuator cylinder;
   a pressurized fluid source disposed outside said actuator cylinder and comprising a pressurized fluid; and a conduit extending from said pressurized fluid source and is at least disposable within an interior of said actuator rod.
2. The aircraft landing gear actuation system of example 1, wherein pressurized fluid from said fluid source exerts a force on said actuator that biases said actuator piston in a landing gear retraction direction.
3. The aircraft landing gear actuation system of any of examples 1-2, wherein said actuator is a hydraulic actuator.
4. The aircraft landing gear actuation system of any of examples 1-3, wherein said actuator rod comprises a first end section that is disposed outside of said actuator cylinder at all times.
5. The aircraft landing gear actuation system of example 4, wherein said first end section of said actuator rod is connectable with landing gear.
6. The aircraft landing gear actuation system of any of examples 1-5, wherein said pressurized fluid comprises at least one gas.
7. The aircraft landing gear actuation system of any of examples 1-6, further comprising at least one vent fluidly connected with said pressurized fluid source.
8. The aircraft landing gear actuation system of example 7, wherein said at least one vent extends from said conduit at a location that is outside of said actuator cylinder.
9. The aircraft landing gear actuation system of any of examples 7-8, wherein said at least one vent comprises a valve.
10. The aircraft landing gear actuation system of example 9, wherein said valve comprises a solenoid valve.
11. The aircraft landing gear actuation system of any of examples 7-10, wherein said at least one vent comprises a first vent and a second vent.
12. The aircraft landing gear actuation system of any of examples 1-11, wherein each of said actuator piston and said actuator rod move relative to said conduit during actuation of said actuator.
13. The aircraft landing gear actuation system of any of examples 1-12, wherein each of said conduit and said actuator rod extend through a single end of said actuator cylinder, and wherein said conduit and said actuator rod extend through opposite ends of said actuator cylinder.
14. The aircraft landing gear actuation system of any of examples 1-13, wherein said actuator piston is movable between a first piston position and a second piston position, said first piston position is associated with a deployed landing gear position for said actuator, said second piston position is associated with a retracted landing gear position for said actuator, said actuator cylinder comprises a first cylinder end and a second cylinder end that are oppositely disposed, and said actuator piston moves toward said second cylinder end in moving from said first piston position to said second piston position.
15. The aircraft landing gear actuation system of example 14, wherein said actuator piston moves from said first piston position to said second piston position to further retract said actuator rod within said actuator cylinder for said retracted landing gear position.
16. The aircraft landing gear actuation system of any of examples 14-15, wherein said conduit extends through said second cylinder end and said actuator rod extends through said first cylinder end.
17. The aircraft landing gear actuation system of any of examples 15-16, wherein said actuator rod comprises an actuator rod vent that is disposed outside of said actuator cylinder when said actuator piston is disposed in each of said first piston position and said second piston position.
18. The aircraft landing gear actuation system of any of examples 15-17, wherein said pressurized fluid is disposed within an enclosed space within said actuator rod that is defined in part by said actuator piston.
19. The aircraft landing gear actuation system of example 18, further comprising a conduit piston disposed within said actuator rod and fixed relative to said conduit, wherein said actuator piston defines one end of said enclosed space and said conduit piston defines an opposite end of said enclosed space.
20. The aircraft landing gear actuation system of any of examples 15-19, wherein said pressurized fluid exerts a force on a first side of said actuator piston that is opposite a second side of said actuator piston that faces in a direction of said second piston position.
21. The aircraft landing gear actuation system of any of examples 15-20, wherein said pressurized fluid source is disposed outboard of said actuator cylinder in an installed configuration.
22. The aircraft landing gear actuation system of example 14, wherein said actuator piston moves from said first piston position to said second piston position to further extend said actuator rod from said actuator cylinder for said retracted landing gear position.
23. The aircraft landing gear actuation system of any of examples 14 and 22, wherein said conduit extends through said first cylinder end and said actuator rod extends through said second cylinder end.
24. The aircraft landing gear actuation system of any of examples 22-23, wherein said actuator rod lacks an actuator rod vent.
25. The aircraft landing gear actuation system of any of examples 22-24, wherein said pressurized fluid is disposed within an enclosed space within said actuator rod that is defined by an internal closure within said actuator rod that is spaced from said actuator piston, by an inner wall of said actuator rod, and an end of said conduit.
26. The aircraft landing gear actuation system of example 25, wherein said internal closure is proximate an end of said actuator rod that is disposed outside said actuator cylinder.
27. The aircraft landing gear actuation system of any of examples 22-26, wherein a first section of said conduit that extends beyond said actuator cylinder when said actuator is in said deployed landing gear position is of a first outer diameter, and wherein a second section of said conduit that is disposed within said actuator cylinder when said actuator is in said deployed landing gear position is of a second outer diameter that is larger than said first outer diameter.
28. The aircraft landing gear actuation system of any of examples 22-27, wherein said pressurized fluid source is disposed inboard of said actuator cylinder in an installed configuration.
29. An aircraft comprising landing gear interconnected with said actuator rod of the aircraft landing gear actuation system of any of examples 1-28.
30. The aircraft of example 29, wherein said landing gear comprises a lug and said actuator rod is attached to said lug.

31. The aircraft of example 30, wherein said actuator rod is pivotally connected with said lug.

32. A method of operating aircraft landing gear, comprising:

operating an actuator to exert a first retraction force on said aircraft landing gear;

exerting a second retraction force on said aircraft landing gear that is separate from said first retraction force, wherein said second retraction force comprises using a first fluid to exert a fluid pressure on said actuator; and moving said aircraft landing gear from a deployed position to a retracted position using said first retraction force and said second retraction force;

wherein said second retraction force is exerted on said aircraft landing gear both when said aircraft landing gear is locked in said deployed position and during movement of said aircraft landing gear from said deployed position to said retracted position.

33. The method of example 32, wherein said operating an actuator comprises operating a hydraulic actuator using a hydraulic fluid that is separate from said first fluid for said exerting a second retraction force.

34. The method of any of examples 32-33, wherein said exerting a second retraction force comprises using a pressurized fluid source having a fixed volume of said first fluid.

35. The method of any of examples 32-34, wherein said exerting a second retraction force comprises directing said first fluid into an interior of an actuator rod of said actuator.

36. The method of any of examples 32-35, wherein said exerting a second retraction force comprises exerting a gaseous fluid pressure on said actuator.

37. The method of any of examples 32-35, further comprising:

damping movement of said aircraft landing gear, from said retracted position to said deployed position, using said second retraction force.

38. The method of any of examples 32-37, further comprising:

releasing said fluid pressure to allow said aircraft landing gear to reach and be locked in said deployed position at least in a first condition.

39. The method of example 38, wherein said first condition comprises an inability of said actuator to dispose said aircraft landing gear in said deployed position.

BRIEF DESCRIPTION OF THE DRAWINGS

The subject matter of the present disclosure is particularly pointed out and distinctly claimed in the concluding portion of the specification. An understanding of the present disclosure may be further facilitated by referring to the following detailed description and claims in connection with the following drawings. While the drawings illustrate various embodiments employing the principles described herein, the drawings do not limit the scope of the claims. Reference to "in accordance with various embodiments" in this Brief Description of the Drawings also applies to the corresponding discussion in the Detailed Description.

DETAILED DESCRIPTION

Figure 1:
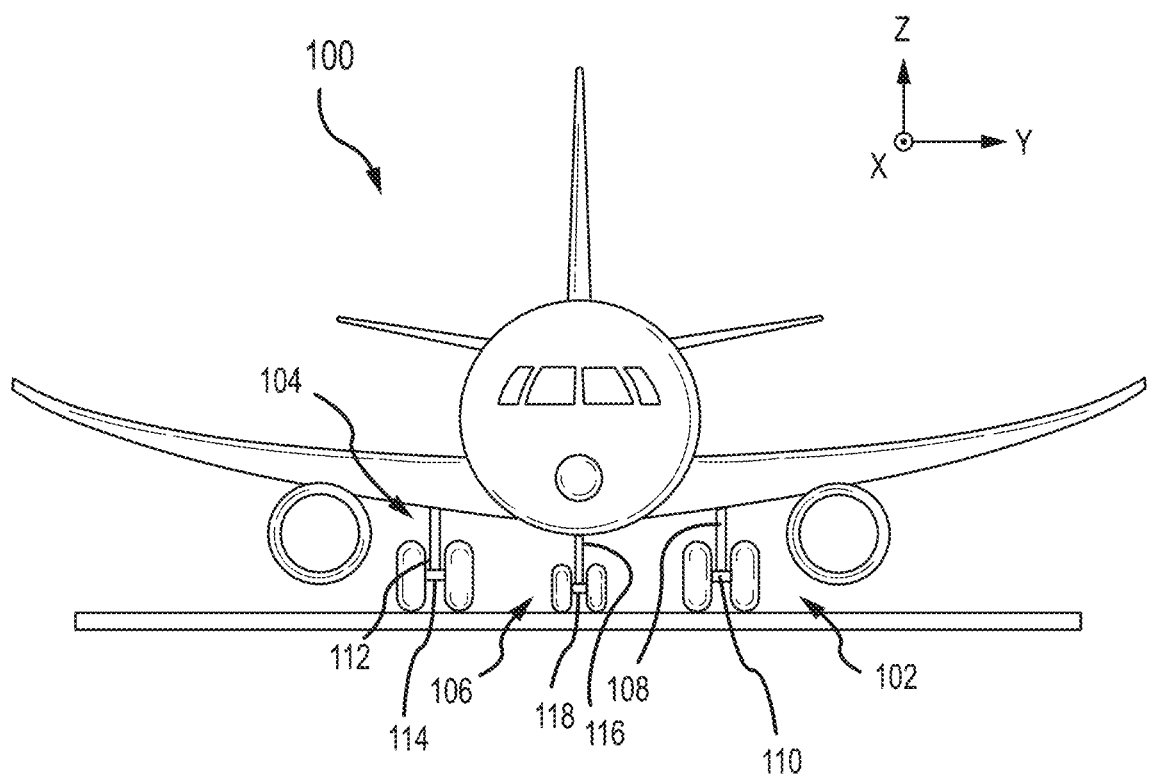
FIG. 1 illustrates an aircraft having a landing gear assembly and wheels mounted thereon, in accordance with various embodiments.

A representative aircraft 100 is illustrated in FIG. 1. The aircraft 100 may include one or more landing gear, such as, for example, a left landing gear 102 (or port-side landing gear), a right landing gear 104 (or starboard-side landing gear) and a nose landing gear 106. Each of the left landing gear 102, the right landing gear 104 and the nose landing gear 106 may support the aircraft 100 when not flying, allowing the aircraft 100 to taxi, takeoff, and land, safely and without damage to the aircraft. The left landing gear 102 may include a left landing gear assembly 108 that includes a left wheel assembly 110, the right landing gear 104 may include a right landing gear assembly 112 that includes a right wheel assembly 114 and the nose landing gear 106 may include a nose landing gear assembly 116 that includes a nose wheel assembly 118.

Figure 2:
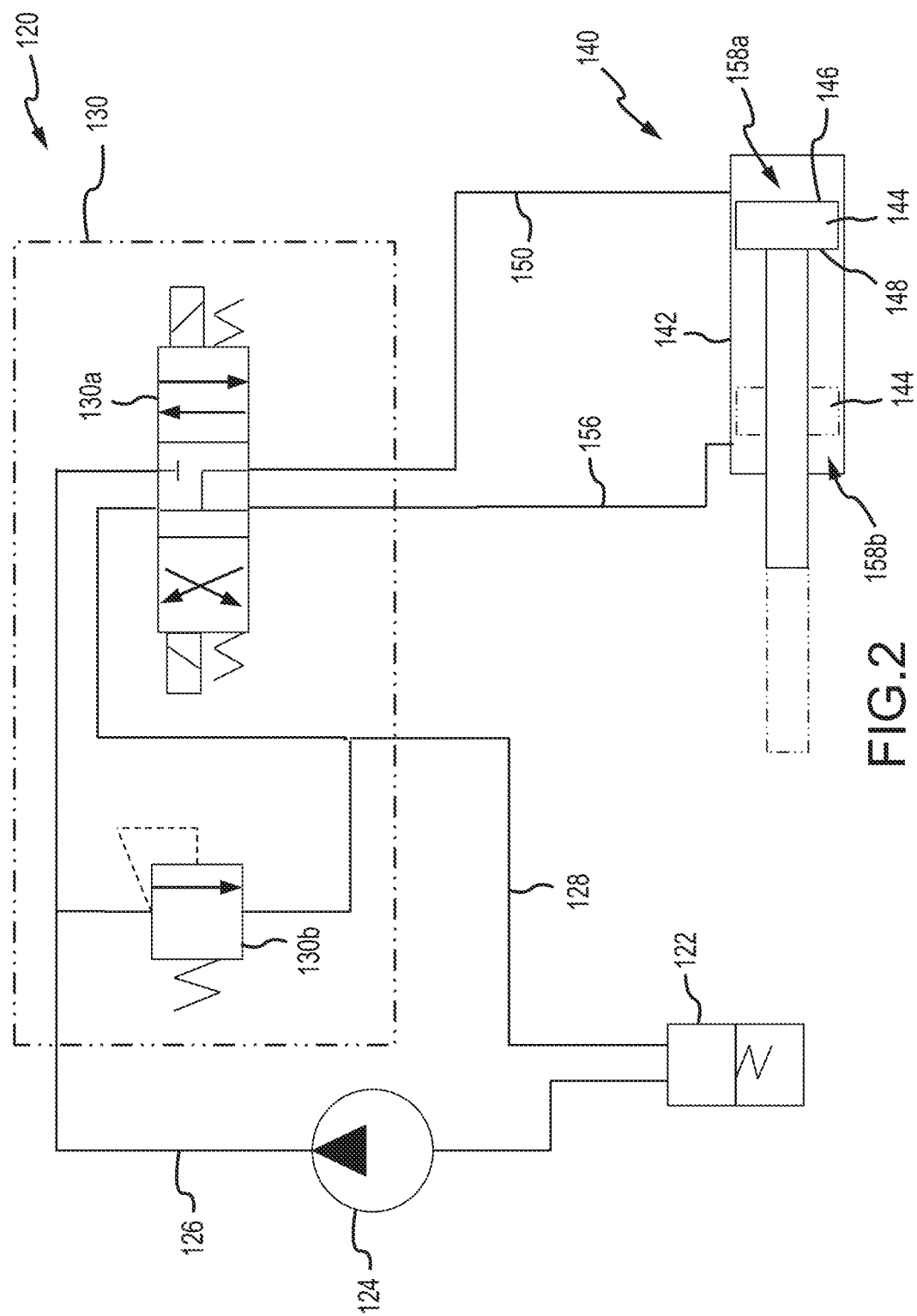
FIG. 2 is a hydraulic system for a landing gear hydraulic actuator, in accordance with various embodiments.

A representative hydraulic system 120 is presented in FIG. 2. The hydraulic system 120 includes a hydraulic fluid source 122, a pump 124, a valve assembly 130 (e.g., a directional control valve 130a and a relief valve 130b), and an actuator 140. An outlet line 126 extends from the hydraulic fluid source 122 to the valve assembly 130, with the outlet line 126 incorporating the pump 124. A return line 128 also extends from the valve assembly 130 to the hydraulic fluid source 122.

The actuator 140 includes a cylinder 142 with a piston 144 movably disposed therein. The piston 144 includes a first side 146 and an oppositely disposed second side 148. An actuator extend line 150 extends from the valve assembly 130 to the cylinder 142 to apply hydraulic fluid to the first side 146 of the piston 144, for instance to move the piston 144 from a first piston position 158a to a second piston position 158b (e.g., to retract landing gear). Hydraulic fluid within the cylinder 142 that interfaces with the second side 148 of the piston 144 will be returned to the valve assembly 130 through the actuator retract line 156 as the piston 144 is moved from the first piston position 158a toward the second piston position 158b (this hydraulic fluid may then be directed back to the hydraulic fluid source 122 via the return line 128).

The actuator retract line 156 extends from the valve assembly 130 to the cylinder 142 to apply hydraulic fluid to the second side 148 of the piston 144, for instance to move the piston 144 from the second piston position 158b to the first piston position 158a (e.g., to deploy landing gear). The actuator extend line 150 extends from the cylinder 142 back to the valve assembly 130. Hydraulic fluid within the cylinder 142 that interfaces with the first side 146 of the piston 144 will be returned to the valve assembly 130 through the actuator extend line 150 as the piston 144 is moved from the second piston position 158b toward the first piston position 158a (this hydraulic fluid may then be directed back to the hydraulic fluid source 122 via the return line 128). It should be appreciated that various arrangements could be utilized to control the flow of hydraulic fluid to and from the actuator 140 to move the piston 144 between the first piston position 158a and the second piston position 158b.

Figure 3:
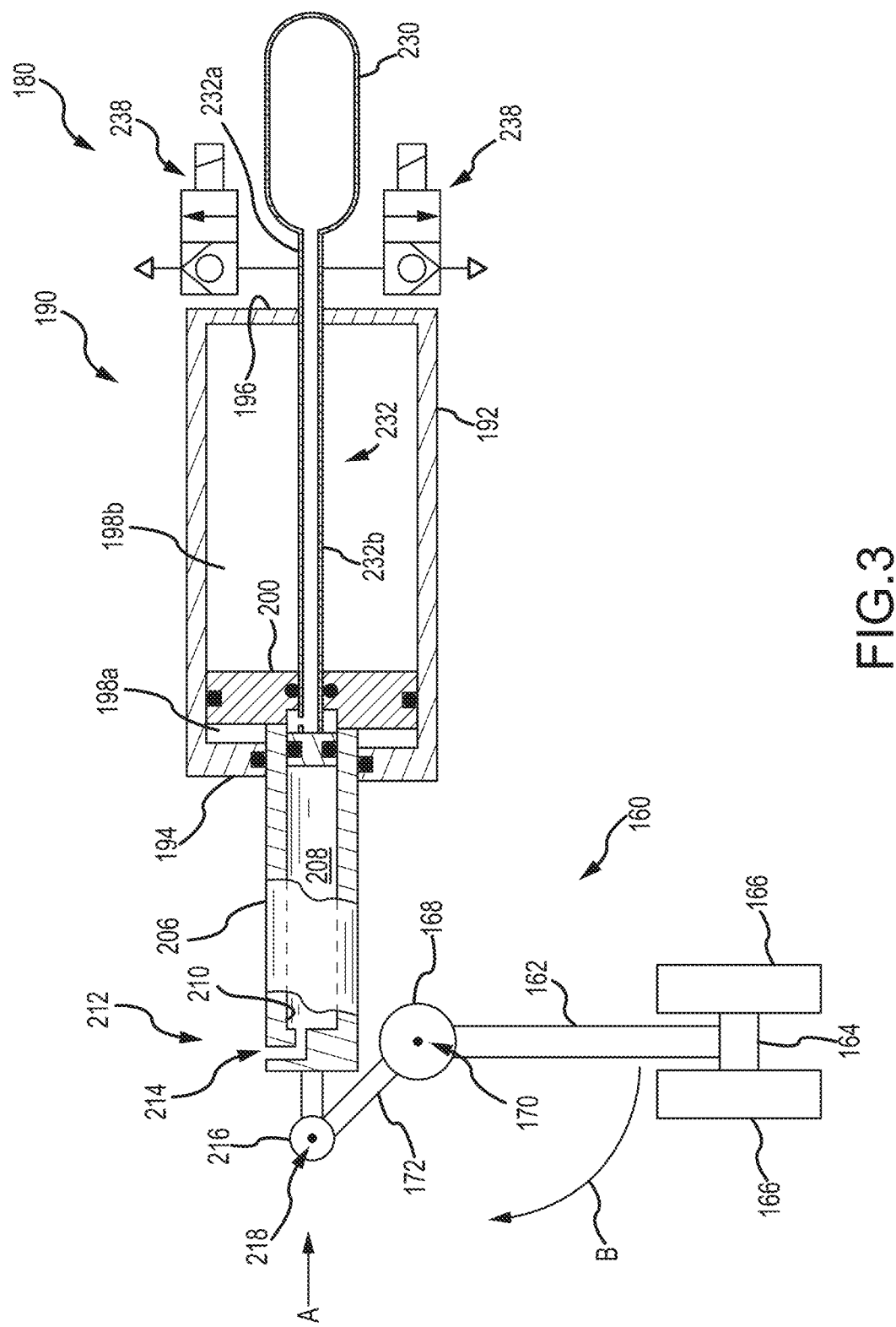
FIG. 3 is a schematic of an aircraft landing gear actuation system, in accordance with various embodiments.

Representative aircraft landing gear 160 is illustrated in FIG. 3 in conjunction with an aircraft landing gear actuation system 180, although the aircraft landing gear actuation system 180 may be used with landing gear of any appropriate configuration. The aircraft landing gear 160 includes a strut 162 that is movably interconnected with an aircraft by a hinge 168 to allow the landing gear 160 to move about a hinge axis 170 in moving between the illustrated deployed position and a retracted position (e.g., where the aircraft landing gear 160 may be disposed within the aircraft). The strut 162 extends to an axle 164 on which a pair of wheels 166 are rotatably mounted. A lug 172 (or other appropriate connector) may be mounted to the hinge 168. An actuation force may be exerted on the lug 172 (having a vector in the direction of the arrow A) by the aircraft landing gear actuation system 180 to move or pivot the aircraft landing gear 160 (in the direction of the arrow B). This movement of aircraft landing gear 160 in the direction of the arrow B changes the aircraft landing gear 160 from the deployed position of FIG. 3 to the above-noted retracted position.

Figure 3A:
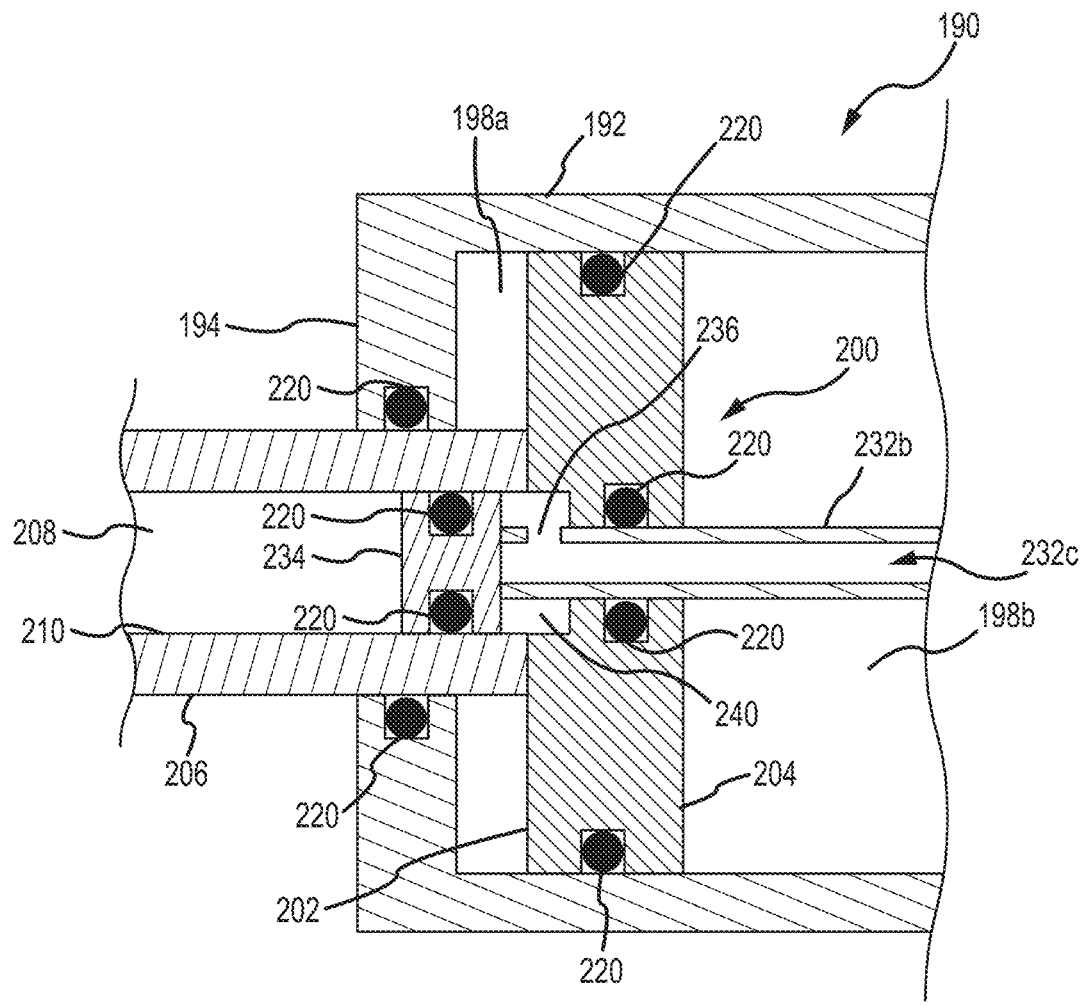
FIG. 3A is an enlarged view of a portion of the aircraft landing gear actuation system of FIG. 3, in accordance with various embodiments.

The aircraft landing gear actuation system 180 is illustrated in FIG. 3 and FIG. 3A. Two separate actuation force sources are used by the aircraft landing gear actuation system 180 for retraction of the landing gear 160—an actuator 190 and a pressurized fluid source 230. The actuator 190 includes an actuator cylinder 192 having a first cylinder end 194 and an oppositely disposed second cylinder end 196. An actuator piston 200 is movably disposed within the actuator cylinder 192. A first side 202 of the piston 200 faces or projects toward the first cylinder end 194, while a second side 204 of the actuator piston 200 faces or projects toward the second cylinder end 196. The first side 202 of the piston 200 may be characterized as interfacing with a landing gear retraction space 198a within the actuator cylinder 192 (the landing gear retraction space 198a being defined as the space within the actuator cylinder 192 between the first side 202 of the actuator piston 200 and the first cylinder end 194). The second side 204 of the piston 200 may be characterized as interfacing with a landing gear deployment space 198b within the actuator cylinder 192 (the landing gear deployment space 198b being defined as with space within the actuator cylinder 192 between the second side 204 of the actuator piston 200 and the second cylinder end 196).

An actuator rod 206 extends from the actuator piston 200 and through the first cylinder end 194. A first end section 212 of the actuator rod 206 is disposed outside/beyond the actuator cylinder 192. A hinge 216 movably interconnects the first end section 212 of the actuator rod 206 with the lug 172 of the aircraft landing gear 160. A hinge axis 218 for the hinge 216 may be parallel with the hinge axis 170 for the aircraft landing gear 160. The actuator rod 206 includes a hollow interior 208 that is bounded by an annular inner surface 210 of the actuator rod 206. The first end section 212 of the actuator rod 206 includes a vent 214 that extends from the exterior of the actuator rod 206 to its hollow interior 208.

Various seals 220 (e.g., of an annular configuration) may be utilized at one or more locations of the aircraft landing gear actuation system 180. For instance: 1) one or more seals 220 may be provided between the perimeter of the actuator piston 200 and the inner surface of the actuator cylinder 192; 2) one or more seals 220 may be provided between the actuator piston 200 and a standpipe 232b (discussed below); 3) one or more seals 220 may be provided between a standpipe piston 234 on the end of the standpipe 232b and the inner surface 210 of the actuator rod 206; and 4) one or more seals 220 may be provided between the actuator cylinder 192 and the actuator rod 206.

The actuator piston 200 may move along an axial path within the actuator cylinder 192. Hydraulic fluid may be directed into the landing gear retraction space 198a to move the actuator piston 200 (and the actuator rod 206) along an axial path in the direction of the second cylinder end 196, to in turn exert a retraction force on the aircraft landing gear 160 (more specifically on the lug 172 and having a vector in the direction of the arrow A) that may be used to change the aircraft landing gear 160 from its deployed position to its retracted position (by movement of the aircraft landing gear 160 about the hinge axis 170 in the direction of the arrow B). Conversely, hydraulic fluid may be directed into the landing gear deployment space 198b to move the actuator piston 200 (and the actuator rod 206) along an axial path in the direction of the first cylinder end 194, to in turn exert a deployment force on the aircraft landing gear 160 (more specifically on the lug 172 and in the opposite direction to that of the arrow A) that may be used to change the aircraft landing gear 160 from its retracted position to its deployed position (by movement of aircraft landing gear 160 about the hinge axis 170 in the opposite direction to that indicated by the arrow B). Hydraulic fluid may be directed into and out the actuator cylinder 192 of the actuator 190 at least generally in accord with the discussion presented above for the hydraulic system 120 of FIG. 2.

Operation of the actuator 190 in the above-noted manner exerts one actuation force on the lug 172 of the aircraft landing gear 160 to dispose the aircraft landing gear 160 in its retracted position (through movement of the actuator piston 200 and actuator rod 206 relative to the actuator cylinder 192). Another actuation force is exerted on the lug 172 of the aircraft landing gear 160, for retraction of the aircraft landing gear 160, by the pressurized fluid source 230. The pressurized fluid source 230 (e.g., a container of any appropriate size, shape, and/or configuration) may contain a fixed volume of an appropriate pressurized fluid, such as one or more gases, and is illustrated as being outboard of the actuator cylinder 192 in FIG. 3.

A conduit 232 extends from the pressurized fluid source 230, then through the second cylinder end 196, then through the actuator piston 200 (proceeding from the second side 204 to the first side 202), then into the hollow interior 208 of the actuator rod 206, and then to a standpipe stop or piston 234 (see also FIG. 3A). This conduit 232 may be characterized as including a first conduit section 232a that extends from the pressurized fluid source 230 to the actuator cylinder 192 (e.g., located outside the actuator cylinder 192), and as further including a second conduit section or standpipe 232b that is located within the actuator cylinder 192, that extends through the actuator piston 200, and that is at least disposable within the hollow interior 208 of the actuator rod 206 (e.g., the standpipe 232b will extend within the hollow interior 208 of the actuator rod 206 at least at some point in time during operation of the actuator 190, and encompassing where the standpipe 232b always extends within the hollow interior 208 of the actuator rod 206).

The standpipe 232b may be attached or fixed to the second cylinder end 196 in any appropriate manner, and furthermore may be interconnected with the standpipe piston 234 in any appropriate manner that maintains the standpipe 232b and the piston 234 in a fixed position relative to one another. At least part of the standpipe piston 234 is at all times disposed within the hollow interior 208 of the actuator rod 206. An end portion of the standpipe 232b extends into the hollow interior 208 of the actuator rod 206 when the landing gear 160 is in the deployed configuration shown in FIGS. 3 and 3A, although this may not be the case in all instances. However, at least at some point in time during the retraction of the landing gear 160 the standpipe 232b will extend into the hollow interior 208 of the actuator rod 206.

The actuator piston 200 and the actuator rod 206 collectively move relative to the standpipe 232b and the standpipe piston 234 during operation of the actuator 190. The standpipe piston 234 at the end of the standpipe 232b is spaced from the actuator piston 200 and that may be referred to as a counterbalance or counterbalancing space 240 for receiving pressurized fluid from the pressurized fluid source 230 via a flowpath 232c through the conduit 232 (the flowpath extending through each of the first conduit section 232a and the standpipe 232b). In this regard, the standpipe 232b may include one or more outlet ports 236 to direct pressurized fluid from the flowpath 232c into the counterbalance space 240.

When the actuator landing gear actuation system 180 is in the configuration shown in FIG. 3, the aircraft landing gear 160 is disposed in its deployed position. Typically, the aircraft landing gear 160 will be locked in its deployed position. At this time and referring now to both FIGS. 3 and 3A, pressurized fluid within the counterbalance space 240 (from the pressurized fluid source 230) is exerting pressure on the first side 202 of the actuator piston 200 that generates a force on the actuator piston 200 having a vector in the direction of the second cylinder end 196 (a force to move the aircraft landing gear 160 to its retracted position, and in the direction of the arrow A). This may be referred to as the pressurized fluid source 230 exerting a biasing force on the actuator piston 200 in a direction that, with the aircraft landing gear 160 being unlocked, would attempt to move the aircraft landing gear 160 from its deployed position toward its retracted position. As such, this force provided by the pressurized fluid source 230 augments the force exerted on the actuator piston 200 by hydraulic fluid acting on the landing gear retraction space 198a (the pressurized fluid within the counterbalance space 240 and the hydraulic fluid within the landing gear retraction space 198a act on different portions of the first side 202 of the actuator piston 200, and the pressurized fluid within the counterbalance space 240 may be segregated (e.g., fluidly isolated) from the hydraulic fluid within the landing gear retraction space 198a). Based upon this additional force provided by the pressurized fluid source 230 for retraction of the aircraft landing gear 160, the physical size of the actuator 190 may be reduced. This size reduction for the actuator 190 allows for a reduced flow of hydraulic fluid into the actuator 190 to retract the aircraft landing gear 160, which thereby consumes less energy. Based upon the above-described configuration and operation of the actuator 190, the standpipe 232b will be in tension at least during the noted operation of the actuator 190 to retract the landing gear 160.

The pressurized fluid source 230 also provides functionality when moving aircraft landing gear 160 from its retracted position to its deployed position, for instance through operation of the actuator 190 (or by "free fall" of the aircraft landing gear 160 to the deployed position). Again, hydraulic fluid may be directed into the landing gear deployment space 198b within the actuator cylinder 192 to move the actuator piston 200 (and the actuator rod 206) in the direction of the first cylinder end 194, to in turn exert a deployment force on the aircraft landing gear 160 (more specifically on the lug 172 and in the opposite direction to that of the arrow A) that may be used to change the aircraft landing gear 160 from its retracted position to its deployed position (by movement of aircraft landing gear 160 about the hinge axis 170 in the opposite direction to that indicated by the arrow B). This actuation force from operation of the actuator 190 is opposed or resisted by the fluid pressure within the counterbalance space 240 (provided thereto by the pressurized fluid source 230 and the standpipe 232b). It should be appreciated that the force exerted on the actuator piston 200 by the pressurized fluid within the counterbalance space 240 will progressively increase as the size of the counterbalance space 240 is progressively reduced (by movement of the actuator piston 200 in the direction of the first cylinder end 194, which produces a corresponding movement of the actuator rod 206). The pressurized fluid source 230 may be characterized as providing a damping function for deployment of the aircraft landing gear 160, which may be desirable in one or more respects (e.g., during "free fall" of the aircraft landing gear 160 to the deployed position-a deployment of the aircraft landing gear 160 other than through controlled operation of the actuator 190).

It may be that the actuator 190 is unable fully deploy the aircraft landing gear 160 in at least certain failure situations that require alternate extension or "free fall" of the landing gear 160. In such a situation, the pressurized fluid source 230 and the corresponding fluid pressure within the counterbalance space 240, may preclude the aircraft landing gear 160 from reaching its fully deployed position such that the aircraft landing gear 160 may then not be locked for landing. As such, the aircraft landing gear actuation system 180 includes one or more vent valves 238 (e.g., solenoid-operated) to depressurize the pressurized fluid source 230. Depressurizing the counterbalance space 240 allows gravitational forces to dispose the aircraft landing gear 160 in its fully deployed position such that it may be locked for landing.

Figure 4A:
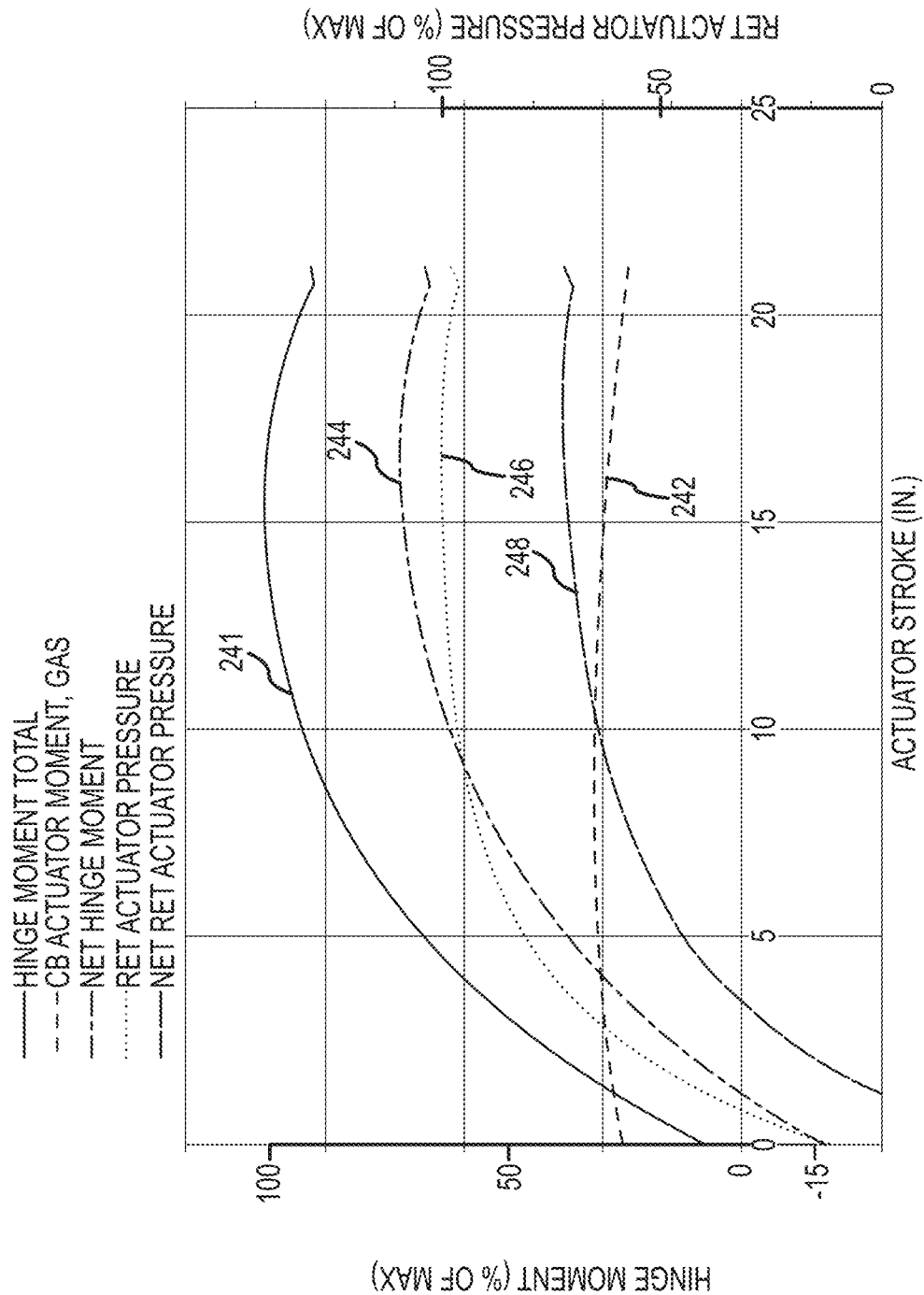
FIG. 4A illustrates various curves relating to operation of the aircraft landing gear actuation system of FIG. 3, in accordance with various embodiments.

FIG. 4A illustrates benefits of the aircraft landing gear actuation system 180, particularly its use of the pressurized fluid source 230. Various plots are presented in FIG. 4A, with the Y axis being the hinge moment (the moment about the hinge 168 during retraction of the landing gear 160 from the deployed position of FIG. 3) and with the X axis being the stroke of the actuator 190 (the distance traveled by the piston 200 and the actuator rod 206 during a retraction operation by the aircraft landing gear actuation system 180). Curve 241 illustrates resistive operational hinge moment of a conventional hydraulic actuator to retract the aircraft landing gear 160 (similar to the actuator 190, but without utilizing the pressurized fluid source 230 and its related components). Frictional forces, gravitational loads, and aerodynamic loads contribute to the moment embodied by the curve 241. Curve 242 represents the moment associated with use of the pressurized fluid source 230 and its related components to retract the aircraft landing gear 160 (utilizing a pressurized fluid source 230 of a fixed volume of 285 in.$^3$ and pressurized at 5,000 psi with the actuator piston 200 and actuator rod 206 being in the FIG. 3 position). Curve 244 illustrates the moment of the combined resistive operational hinge moment of the actuator 190 and the use of the aiding pressurized fluid source 230 and its related components (utilizing a pressurized fluid source 230 of a fixed volume of 285 in.$^3$ (4,670 ml) and pressurized at 5,000 psi (34.5 MPa) with the actuator piston 200 and actuator rod 206 being in the FIG. 3 position), all to retract the aircraft landing gear 160. Curve 246 illustrates the pressure curve for operation of an actuator (without utilizing the pressurized fluid source 230 and its related components), while curve 248 illustrates the pressure curve for operation of the actuator 190, in combination with utilizing the pressurized fluid source 230 in its related components, to retract the aircraft landing gear 160.

Figure 4B:
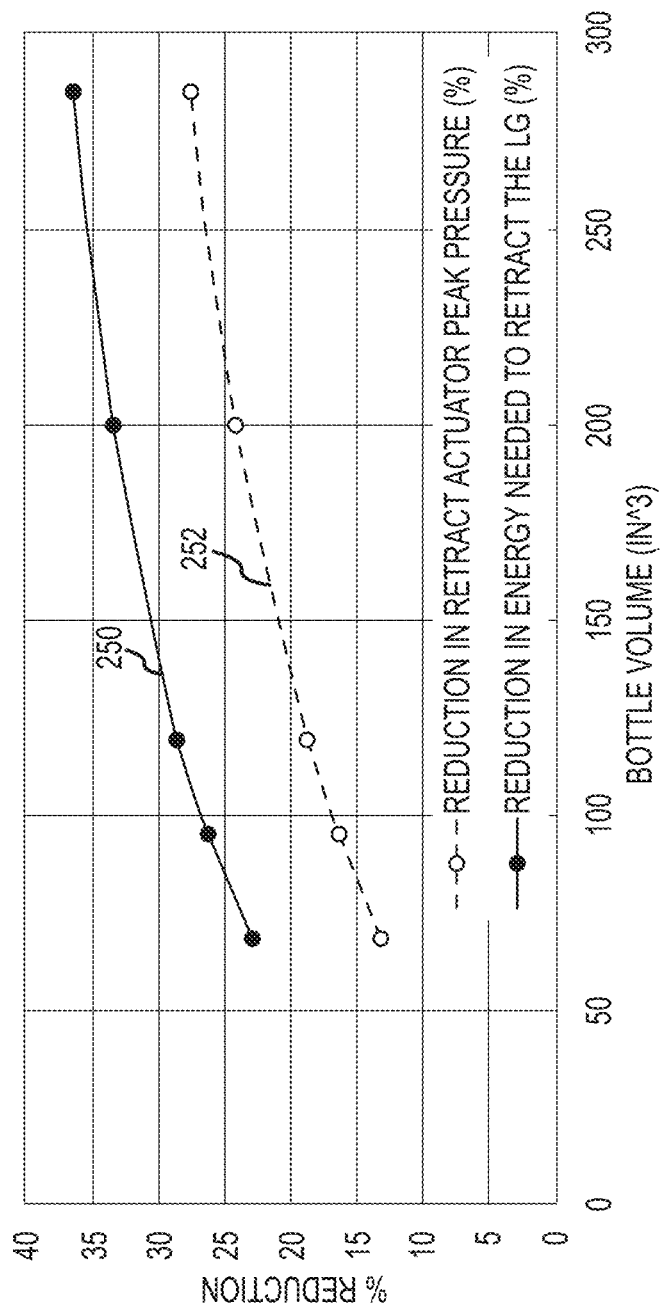
FIG. 4B illustrates curves regarding sizing effects of a pressurized fluid source used by the aircraft landing gear actuation system of FIG. 3, in accordance with various embodiments.

FIG. 4B illustrates the effects of the magnitude of a fixed volume for the pressurized fluid source 230, with the fixed volume being on the X axis and with a percent reduction being on the Y axis. Curve 250 illustrates the percentage reduction in energy required to retract the aircraft landing gear 160 versus the fixed volume of the pressurized fluid source 230. Curve 252 illustrates the percentage reduction in peak pressure for operation of the actuator 190 to retract the aircraft landing gear 160 versus the fixed volume of the pressurized fluid source 230.

Figure 5:
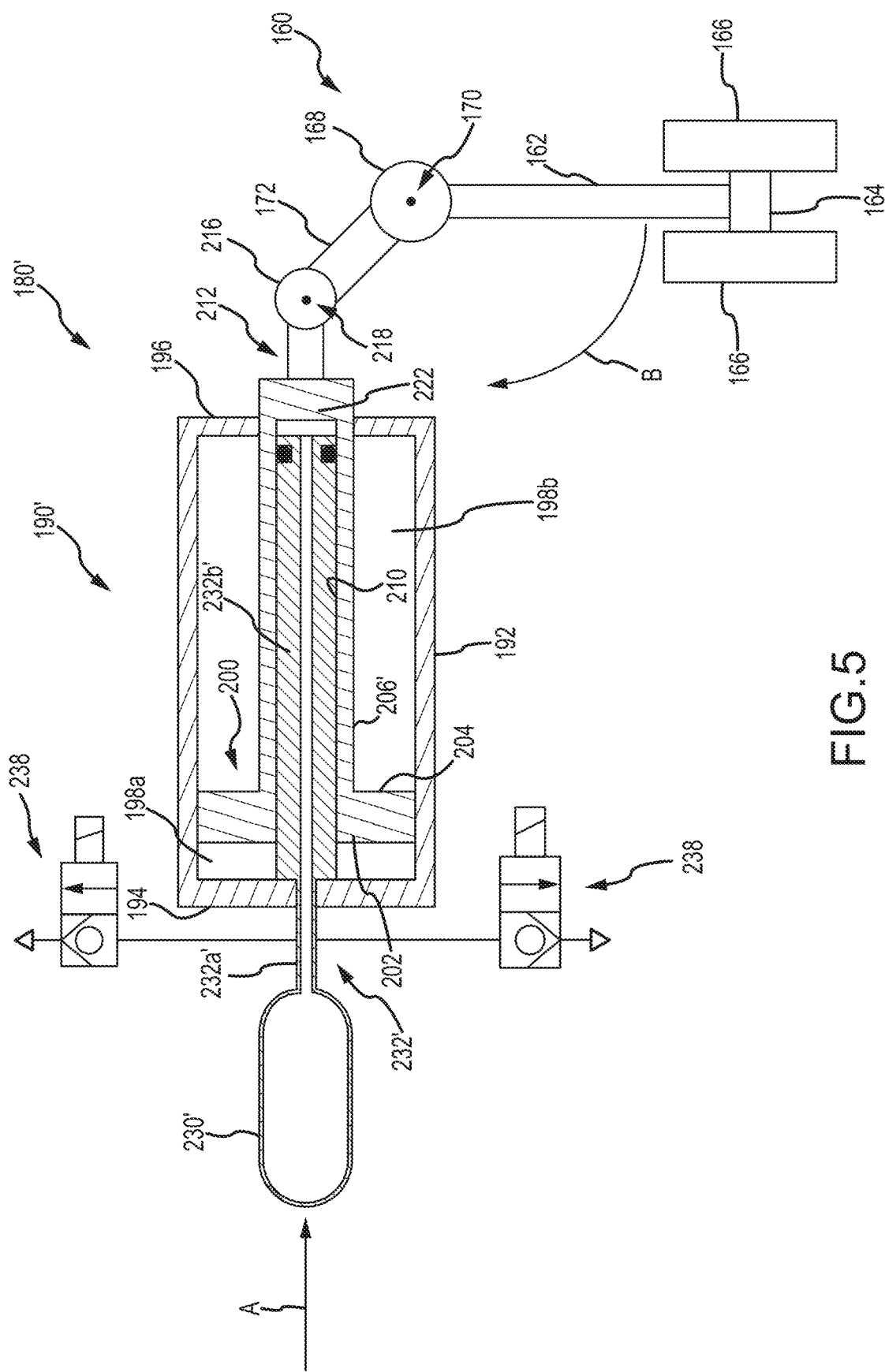
FIG. 5 is a schematic of another aircraft landing gear actuation system, in accordance with various embodiments.
Figure 5A:
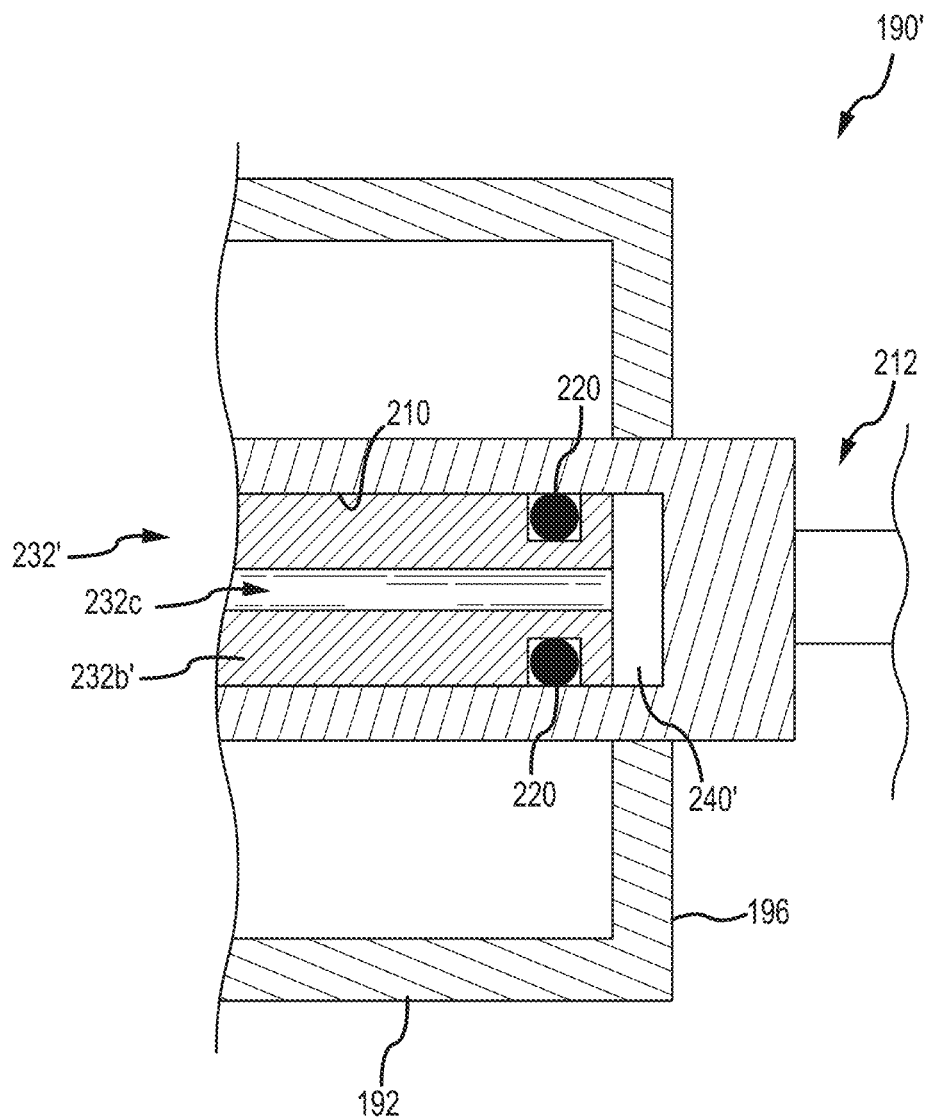
FIG. 5A is an enlarged view of a portion of the aircraft landing gear actuation system of FIG. 5, in accordance with various embodiments.

The above-described aircraft landing gear actuation system 180 may be characterized as being of an actuator rod retraction configuration to retract the aircraft landing gear 160. A variation of the landing gear actuation system 180 is presented in FIGS. 5 and 5A, is identified by reference numeral 180', and may be characterized as being of an actuator rod extension configuration to retract the aircraft landing gear 160. Corresponding components between the aircraft landing gear actuation system 180 (FIG. 3) and the aircraft landing gear actuation system 180' (FIG. 5) are identified by the same reference numerals, and unless otherwise noted herein to the contrary the corresponding discussion presented above remains applicable. Those corresponding components that differ in some respect are identified by a "single prime" designation in FIGS. 5 and 5A.

The aircraft landing gear actuation system 180' of FIG. 5 and FIG. 5A also utilizes two separate actuation force sources for retraction of the aircraft landing gear 160—an actuator 190' and a pressurized fluid source 230'. Operation of the actuator 190' (FIG. 5) is at least generally in accord with operation of the actuator 190 (FIG. 3). In this regard, hydraulic fluid may be directed into the landing gear retraction space 198a to move the actuator piston 200 (and the actuator rod 206') in the direction corresponding with the arrow A, to in turn exert a retraction force on the aircraft landing gear 160 (more specifically on the lug 172 and with this retraction force having a vector in the direction of the arrow A) that may be used to change the aircraft landing gear 160 from its deployed position (FIG. 5) to its retracted position (by movement of the aircraft landing gear 160 about the hinge axis 170 in the direction of the arrow B). Conversely, hydraulic fluid may be directed into the landing gear deployment space 198b to move the actuator piston 200 (and the actuator rod 206') in the direction of the first cylinder end 194, to in turn exert a deployment force on the aircraft landing gear 160 (more specifically on the lug 172 and with this deployment force being in the opposite direction to that of the arrow A) that may be used to change the aircraft landing gear 160 from its retracted position to its deployed position (by movement of aircraft landing gear 160 about the hinge axis 170 in the opposite direction to that indicated by the arrow B). Hydraulic fluid may be directed into and out the actuator cylinder 192' of the actuator 190' at least generally in accord with the discussion presented above for the hydraulic system 120 of FIG. 2.

The pressurized fluid source 230' (e.g., a container of any appropriate size, shape, and/or configuration) may contain a fixed volume of an appropriate pressurized fluid, such as one or more gases, and is illustrated as being inboard of the actuator cylinder 192' in FIG. 5. The conduit 232' extends from the pressurized fluid source 230', then through the first cylinder end 194, then through the actuator piston 200 (proceeding from the first side 202 to the second side 204), then into the hollow interior (bounded by its inner surface 210) of the actuator rod 206', and terminates in spaced relation to an internal closure or closed end 222 of the actuator rod 206'. The conduit 232' again may be characterized as including a first conduit section 232a' that is located outside the actuator cylinder 192, and as further including a second conduit section or standpipe 232b' that extends within the hollow interior of the actuator rod 206'. The counterbalance space 240' is defined as the gap between the end of the standpipe 232b' and the internal closure 222 of the actuator rod 206', and receives pressurized fluid from the pressurized fluid source 230' (discharged through the open end of the standpipe 232b' and via the flowpath 232c through the conduit 232'). The actuator piston 200 and the actuator rod 206' collectively move relative to the standpipe 232b' during operation of the actuator 190'.

The standpipe 232b' may be attached or fixed to the first cylinder end 194 in any appropriate manner. Moreover, the exterior of the standpipe 232b' may be disposed in interfacing or closely-spaced relation to the inner surface 210 of the actuator rod 206'. Based upon the above-described configuration and operation of the actuator 190', the standpipe 232b' will be in compression at least during the noted operation of the actuator 190' to retract the landing gear 160.

When the actuator landing gear actuation system 180' is in the configuration shown in FIG. 5, the aircraft landing gear 160 is disposed in its deployed position. At this time, pressurized fluid within the counterbalance space 240' (from the pressurized fluid source 230') is exerting pressure on internal closure 222 within the hollow interior 208 of the actuator rod 206' that generates a force on the actuator rod 206' having a vector in the direction of the arrow A in FIG. 5 (a force to move the aircraft landing gear 160 to its retracted position and in the direction of the arrow B in FIG. 5). This may be referred to as the pressurized fluid source 230' exerting a biasing force on the actuator rod 206' in a direction that, with the aircraft landing gear 160 being unlocked, would attempt to move the aircraft landing gear 160 from its deployed position toward its retracted position. As such, this force provided by the pressurized fluid source 230' augments the force exerted on the actuator piston 200 by the hydraulic fluid acting on the landing gear retraction space 198a (the pressurized fluid within the counterbalance space 240' and the hydraulic fluid within the landing gear retraction space 198a act on different portions of actuator 190' (the actuator rod 206' and the first side 202 of the actuator piston 200, respectively, and at locations that are spaced along the length dimension of the actuator 190'), and the pressurized fluid within the counterbalance space 240' may be segregated (e.g., fluidly isolated) from the hydraulic fluid within the landing gear retraction space 198a). Based upon this additional force provided by the pressurized fluid source 230' for retraction of the aircraft landing gear 160, the physical size of the actuator 190' may be reduced. This size reduction for the actuator 190' allows for a reduced flow of hydraulic fluid into the actuator 190' to retract the aircraft landing gear 160, which thereby consumes less energy.

The pressurized fluid source 230' (FIG. 3) also provides the same functionality as the pressurized fluid source 230 (FIG. 3) when moving the aircraft landing gear 160 from its retracted position to its deployed position (through operation of the actuator 190' or by "free fall" of the aircraft landing gear 160). For instance, the actuation force from operation of the actuator 190' (to move the landing gear 160 from the retracted position to the deployed position of FIG. 5) is opposed or resisted by the fluid pressure within the counterbalance space 240' (provided thereto by the pressurized fluid source 230' and the standpipe 232'). The pressurized fluid source 230' may be characterized as providing a damping function for deployment of the aircraft landing gear 160, which may be desirable in one or more respects (e.g., during alternate extension or "free fall" of the aircraft landing gear 160 to the deployed position-a deployment of the aircraft landing gear 160 other than through controlled operation of the 190').

The hydraulic fluid to operate the actuators 190, 190' in accordance with the foregoing may be provided by a centralized hydraulic system for the aircraft, or may be provided by a localized hydraulic system (e.g., for the case of electrified landing gear architectures for electrified actuation of landing gear). Using two separate actuation forces to deploy the landing gear reduces one or more requirements associated with the actuators 190, 190' (e.g., accommodates sizing reductions and corresponding weight reductions; accommodates reduction of the amount of hydraulic fluid flow and thereby reduced energy requirements). The utilization of the pressurized fluid system 230, 230' (that provides a separate actuation force from that provided by the corresponding actuator 190, 190') also dampens deployment of the landing gear (e.g., a controlled deployment), including in an alternate extension or "free-fall" deployment of the landing gear.

Figure 6:
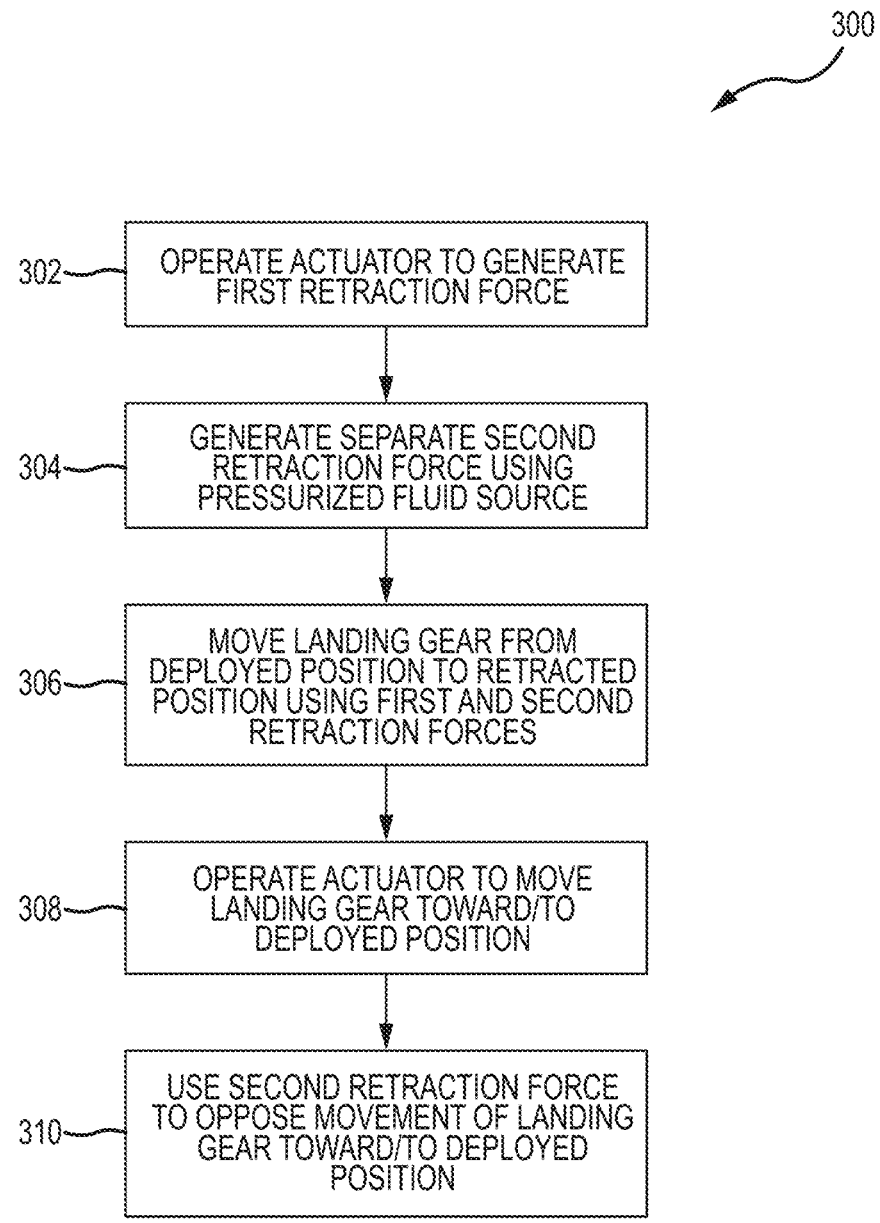
FIG. 6 is a flowchart of a protocol for operating aircraft landing gear.

A protocol (e.g., a method) for operating aircraft landing gear is illustrated in FIG. 6 and is identified by reference numeral 300. The protocol 300 includes operating an actuator to generate a first retraction force (302), generating a second retraction force using a pressurized fluid source (304) (e.g., a fixed volume of a pressurized fluid), and moving landing gear from a deployed position to a retracted position using both the first and second retraction forces (306). The actuator may also be operated to move the landing gear from its retracted position toward or to its deployed position (308). The second retraction force may be used to oppose movement of the landing gear toward/to its deployed position (310) and including through operation of the actuator to deploy the landing gear (308). Continuing to apply the second retraction force during deployment of the landing gear (310) may be of value in at least certain cases, including during normal operation and a "free fall" of the landing gear to the deployed position (e.g., other than through controlled operation of the actuator), in which case the second retraction force may be characterized as damping the deployment of the landing gear. However, it may be desirable to vent the pressurized fluid source (304) before or during the first half of landing gear deployment so as to reduce forces resisting the landing gear achieving a locked state in the fully deployed position.

Any feature of any other various aspects addressed in this disclosure that is intended to be limited to a "singular" context or the like will be clearly set forth herein by terms such as "only," "single," "limited to," or the like. Merely introducing a feature in accordance with commonly accepted antecedent basis practice does not limit the corresponding feature to the singular. Moreover, any failure to use phrases such as "at least one" also does not limit the corresponding feature to the singular. Use of the phrase "at least substantially," "at least generally," or the like in relation to a particular feature encompasses the corresponding characteristic and insubstantial variations thereof (e.g., indicating that a surface is at least substantially or at least generally flat encompasses the surface actually being flat and insubstantial variations thereof). Finally, a reference of a feature in conjunction with the phrase "in one embodiment" does not limit the use of the feature to a single embodiment.

The foregoing description has been presented for purposes of illustration and description. Furthermore, the description is not intended to limit the invention to the form disclosed herein. Consequently, variations and modifications commensurate with the above teachings, and skill and knowledge of the relevant art, are within the scope of the present disclosure. Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A method of operating an aircraft landing gear, comprising:
   operating an actuator to exert a first retraction force on said aircraft landing gear,
   wherein said actuator comprises an actuator rod, an actuator cylinder, and an actuator piston,
   exerting a second retraction force on said aircraft landing gear that is separate from said first retraction force, wherein said second retraction force comprises using a first fluid to exert a fluid pressure on said actuator,
   moving said aircraft landing gear from a deployed position to a retracted position using said first retraction force and said second retraction force; and
   operating a conduit extending from said first fluid, wherein a first section of the conduit that extends beyond the actuator cylinder when the actuator is in said deployed position is of a first outer diameter,
   wherein a second section of the conduit that is disposed within the actuator cylinder when the actuator is in said deployed position is of a second outer diameter that is larger than the first outer diameter.

2. The method of claim 1, wherein operating said actuator comprises operating a hydraulic actuator using a hydraulic fluid that is separate from said first fluid for exerting said second retraction force.

3. The method of claim 1, wherein exerting said second retraction force comprises directing said first fluid into an interior of said actuator rod of said actuator.

4. The method of claim 1, wherein exerting said second retraction force comprises exerting a gaseous fluid pressure on said actuator.

5. The method of claim 1, further comprising:
   damping movement of said aircraft landing gear, from said retracted position to said deployed position, using said second retraction force.

6. The method of claim 1, further comprising:
   releasing said fluid pressure to allow said aircraft landing gear to reach and be locked in said deployed position at least in a first condition;
   wherein said first condition comprises an inability of said actuator to dispose said aircraft landing gear in said deployed position.

7. The method of claim 1, further comprising:
   moving said aircraft landing gear from said retracted position to said deployed position using the first retraction force and the second retraction force; and
   using the second retraction force to oppose the movement of said aircraft landing gear to the deployed position.

8. The method of claim 1, wherein said second retraction force is exerted on said aircraft landing gear both when said aircraft landing gear is locked in said deployed position and during movement of said aircraft landing gear from said deployed position to said retracted position.

9. The method of claim 1, wherein exerting said second retraction force entails a second fluid pressure exerted on said actuator by a fixed volume of said first fluid.

* * * * *